United States Patent [19]

Sugawara

[11] Patent Number: 5,025,375

[45] Date of Patent: Jun. 18, 1991

[54] VOLUME DATA TRANSMISSION SYSTEM

[75] Inventor: Michitaka Sugawara, Utsunomiya, Japan

[73] Assignee: Kabushiki Kaisha Toshiba, Kawasaki, Japan

[21] Appl. No.: 228,148

[22] Filed: Aug. 4, 1988

[30] Foreign Application Priority Data

Aug. 10, 1987 [JP] Japan ................................ 62-198105

[51] Int. Cl.⁵ .......................... G06G 7/60; G06K 9/36
[52] U.S. Cl. .............................. 364/413.22; 364/522; 364/900; 382/56
[58] Field of Search ............ 364/413.22, 900 MS File, 364/522; 382/6, 9, 56

[56] References Cited

U.S. PATENT DOCUMENTS

| | | | |
|---|---|---|---|
| 4,555,802 | 11/1985 | Fedak et al. ............................ | 382/56 |
| 4,653,112 | 3/1987 | Ouimette .............................. | 382/69 |
| 4,742,554 | 5/1988 | Tsuda ................................... | 382/50 |
| 4,783,834 | 11/1988 | Anderson et al. ................. | 382/56 X |
| 4,817,050 | 3/1989 | Komatsu et al. ..................... | 364/900 |

OTHER PUBLICATIONS

Frieder et al., "Back-to-Front Display of Voxel-Based Objects," IEEE Computer Graphics and Applications, pp. 52-60, Jan. 1985.

Primary Examiner—Jerry Smith
Assistant Examiner—Steven G. Kibby
Attorney, Agent, or Firm—Finnegan, Henderson, Farabow, Garrett, and Dunner

[57] ABSTRACT

A volume data transmission system for transmitting volume data consisting of voxel data through a communication line includes a projection data generating section, a data selecting section, and a data transmitter section. The projection data generating section generates binary projection data from the volume data in accordance with whether predetermined significant data is included in any of voxel data along a plurality of predetermined directions in a 3-dimensional space. The data selecting section selects only voxel data having significant data corresponding to any of the binary projection data on the basis of the binary projection data. The transmitter section transmits the binary projection data and the selected voxel data.

11 Claims, 5 Drawing Sheets

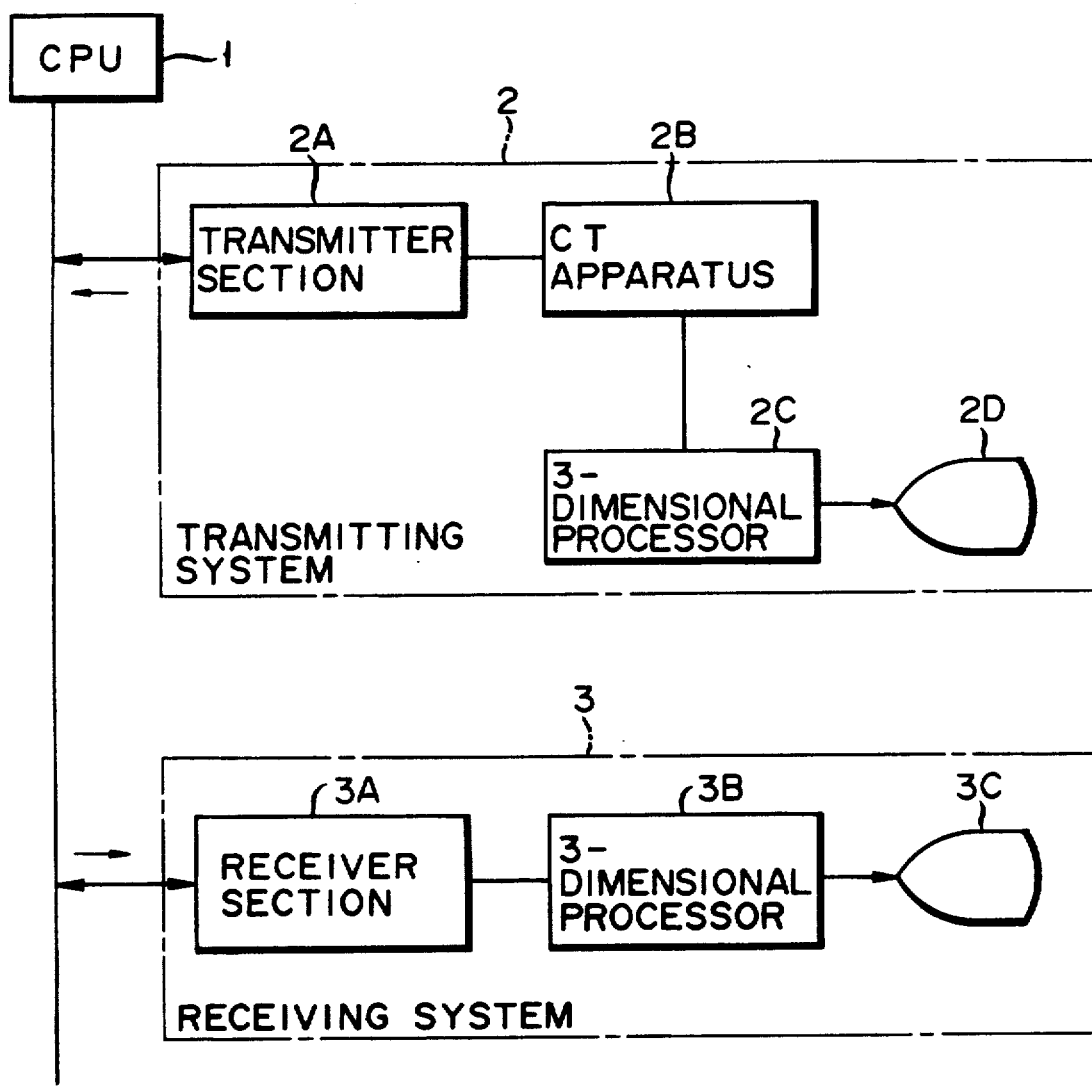
F I G. 1

VOLUME DATA TRANSMISSION SYSTEM

BACKGROUND OF THE INVENTION

1. Field of the Invention

The present invention relates to a volume data transmission system for efficiently transmitting volume data having a 3-dimensional structure consisting of a large number of so-called voxel data.

2. Description of the Related Art

Recently, in an imaging system such as a computed tomography (CT) system capable of obtaining tomographic image information of a specific slice of an object, 3-dimensional image information is obtained by obtaining not only 2-dimensional tomographic image information of a slice but also tomographic image information of a plurality of adjacent slices. The 3-dimensional image information consists of volume data consisting of a group of a large number of so-called voxel data which are obtained by performing arbitrary processing including interpolation processing if necessary for tomographic image data of a plurality of adjacent slices. The tomographic image data of each slice consists of a group of a large number of pixel data. The volume data is used to perform predetermined 3-dimensional image processing, thereby displaying a tomographic image of an arbitrary section intersecting to a region constituted by the volume data, displaying a pseudo 3-dimensional image, which is a perspective image obtained when an object is viewed from various viewing points, on a 3-dimensional space on the basis of the volume data, or displaying a stereoscopic image by so-called stereoscopy.

In some conventional CT apparatuses, the pseudo volume image is displayed as follows. That is, in such systems, the volume data is constituted by voxel data consisting of gradation values (CT values) in units of voxels. These voxel data are binarized in accordance with whether they exceed a predetermined threshold level or fall within the range of a predetermined level. For example, if an object is a human body, a level between a bone and any other portion is used as a threshold for binarization. Then, gray scale gradation is given to a perspective image of the bone viewed from a virtual viewing direction arbitrarily set in a 3-dimensional space, thereby forming and displaying a stereoscopic pseudo 3-dimensional image.

In the system capable of performing image processing as described above, the volume data must be transmitted between sections constituting the system. However, since the volume data is generally constituted by a large amount of data, data transmission for performing the image processing is performed through a high-speed transmission bus in the conventional CT apparatus. A low-speed bus is not used to process the volume data because a transmission time is prolonged when a large amount of data are to be transmitted.

In a system including the above conventional CT system which can process the volume data and display a pseudo 3-dimensional image and a work station (WS), connected through a public communication line such as a telephone line or another communication line, data must be transmitted between the CT apparatus and the WS in order to display a pseudo 3-dimensional image on the basis of the volume data. In this case, the following three types of data transmission can be performed.

(a) CT slice data consisting of gray scale value data is transmitted. (Therefore, in order to transmit volume data, a large number of CT slice data or gray scale voxel data based on the CT slice data are transmitted.)

(b) Binary voxel data which is obtained by binarization is transmitted as preprocessing for forming a pseudo 3-dimensional image.

(c) Pseudo 3-dimensional image data converted from volume data is transmitted.

Processing times and evaluations of the above three methods are as follows.

(1) In method (a), assuming that one pixel consists of 16 bits and 32 image data each having $512 \times 512$ pixels are differentially compressed (compression ratio $= 70\%$) and transmitted at a communication rate of 9600 bps, the processing time is $512 \times 512 \times 32 \times 16 \times 70\%/9600$ bps $= 2$ hours and 43 minutes.

(2) In method (b), when the data as described above are subjected to 3-dimensional processing and binarization, $256 \times 256$ voxels in each of which 1 pixel $= 1$ bit can be obtained. Therefore, the processing time is $256 \times 256 \times 256/9600$ bps $= 29$ minutes.

(3) In method (c), since an image is transmitted every time a viewing point is changed, the processing time is $512 \times 512 \times 16 \times 70\%/9600$ bps $= 5$ minutes and 5 seconds. For this reason, the processing is stopped for a very long time every time a viewing point for displaying a 3-dimensional image is changed.

As described above, in any of the above methods, a data transmission time for displaying a 3-dimensional image based on the volume data is prolonged.

SUMMARY OF THE INVENTION

It is an object of the present invention to provide a volume data transmission system capable of transmitting volume data to be used in 3-dimensional image processing at high speed.

The volume data transmission system of the present invention comprises a projection data generating section, a data selecting section, and a data transmitter section. The projection data generating section generates binary projection data from volume data consisting of voxel data in accordance with whether predetermined significant data is contained in any of voxel data along a plurality of predetermined directions in a 3-dimensional space. The data selecting section selects only voxel data which contains significant data corresponding to any of the binary projection data from the above voxel data on the basis of the binary projection data. The transmitter section transmits the above binary projection data and the selected voxel data.

According to the volume data transmission system of the present invention, binary projection data of volume data consisting of voxel data are generated at a transmitting side. Upon transmission, the binary projection data and only voxel data having significant data corresponding to any of the binary projection data (the voxel data is selected on the basis of the binary projection data) are transmitted. At a receiving side, since the original volume data is reconstructed on the basis of the binary projection data and the transmitted voxel data, transmission can be performed with high efficiency. Therefore, a data transmission time for processing/displaying a 3-dimensional image can be shortened.

BRIEF DESCRIPTION OF THE DRAWINGS

FIG. 1 is a block diagram showing an arrangement of a volume data transmission system according to an embodiment of the present invention;

DETAILED DESCRIPTION OF THE PREFERRED EMBODIMENT

An embodiment of the volume data transmission system according to the present invention will be described below.

First, prior to a detailed description, the volume data transmission system of this embodiment will be briefly described below with reference to FIGS. 1 and 2.

FIG. 1 is a schematic block diagram of the volume data transmission system.

As shown in FIG. 1, the volume data transmission system comprises host computer (CPU) 1, transmitting system 2, and receiving system 3.

Transmitting and receiving systems 2 and 3 are connected to a communication line which is a transmission bus, i.e., a transmission path of CPU 1. Transmitting system 2 comprises transmitter section 2A, CT apparatus 2B, 3-dimensional processor 2C, and display 2D. Receiving system 3 comprises receiver section 3A, 3-dimensional processor 3B, and display 3C.

Figure 2:
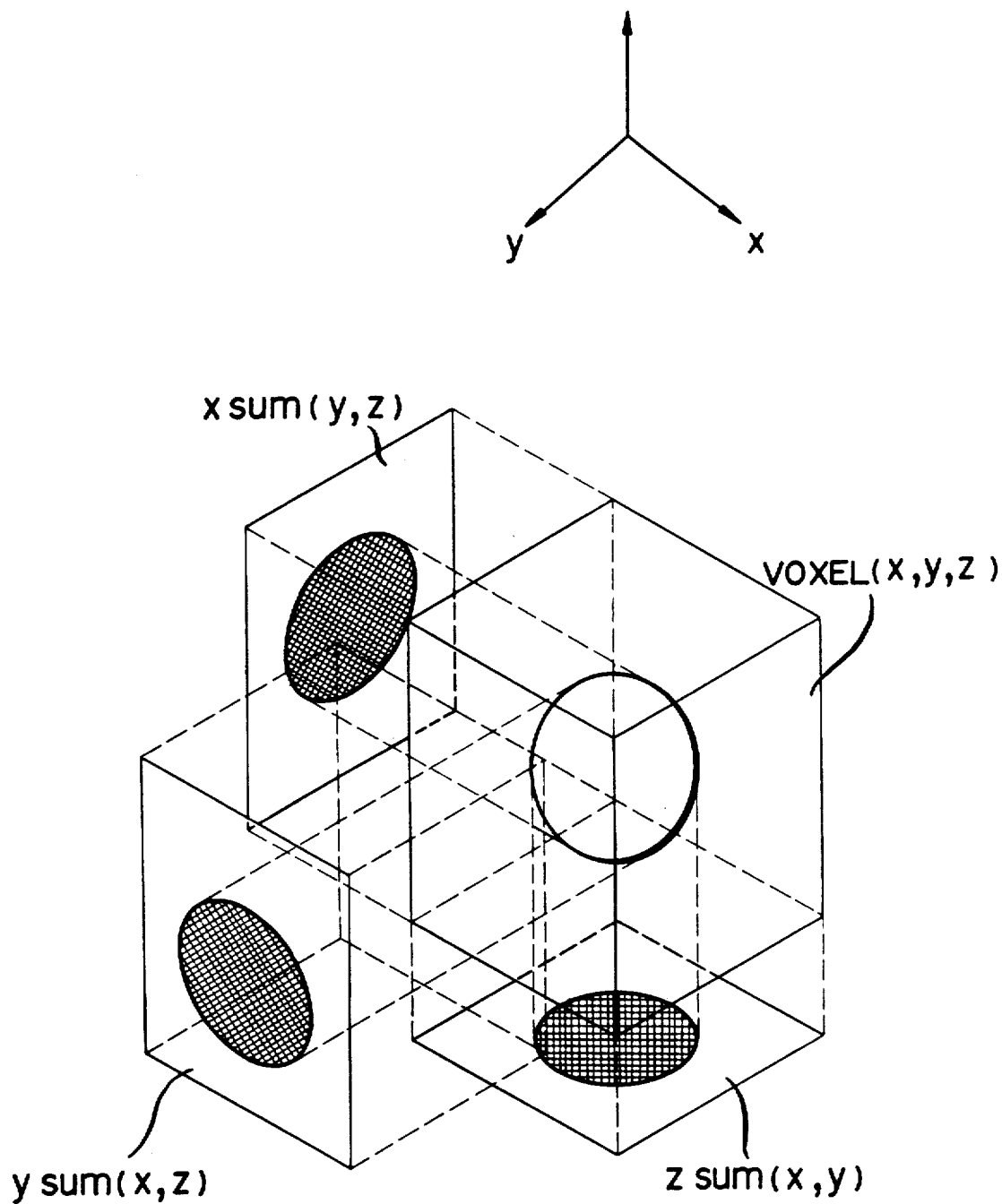
FIG. 2 is a schematic perspective view for explaining a principle of obtaining binary projection data of 3-dimensional voxel data in x, y, and z axes.

Referring to FIG. 2, a concept of the volume data transmission system according to the embodiment of the present invention will be described. In this system, transmitting system 2 transmits 3-dimensional binary voxel data based on volume data to receiving system 3.

First, in transmitting system 2, 3-dimensional binary voxel data is formed from volume data. Then, this binary voxel data is projected in three axis directions of x, y, and z and binarized. As a result, three, e.g., 256×256-pixels binary projection data xsum, ysum, and zsum are generated from the 3-dimensional binary voxel data.

The shape of an object can be obtained more accurately when the binary projection data are generated at a large number of various projection angles. In this embodiment, however, three binary projection data xsum, ysum, and zsum parallel to the x-, y-, and z-axis directions, respectively, are generated for the sake of simplifying data processing. Data xsum, ysum, and zsum are transmitted through the transmission path, i.e., the communication line. After the data xsum, ysum, and zsum are transmitted, the binary voxel data is transmitted.

Upon transmission of the binary voxel data, in order to omit a line consisting of only unnecessary voxels in which values on the x-, y-, and z-axis directions are all 0s, i.e., having no data therein, VOXEL (x,y,z) which satisfies the condition of xsum (y,z)=0 or ysum (x,z)=0 or zsum (x,y)=0 in data xsum, ysum, and zsum is not transmitted.

Only data of VOXEL (x,y,z) which satisfies the condition of xsum (y,z)=1 and ysum (x,z)=1 and zsum (x,y)=1 is transmitted onto the communication line.

In receiving system 3, data of all voxels are cleared beforehand. In addition, receiving system 3 receives data xsum, ysum, and zsum before the binary voxel data is received. Therefore, on the basis of data xsum, ysum, and zsum, a reception bit of the binary voxel data transmitted from the communication line is written in only VOXEL (x,y,z) which satisfies the condition of xsum (y,z)=1 and ysum (x,z)=1 and zsum (x,y)=1.

Data of VOXEL (x,y,z) which satisfies the condition of xsum (y,z)=0 or ysum (x,z)=0 or zsum (x,y)=0 is erased, i.e., cleared beforehand. Therefore, by transmitting only a bit of xsum (y,z)=1 and ysum (x,z) =1 and zsum (x,y)=1, receiving system 3 can recover 100% of the 3-dimensional binary voxel data generated by transmitting system 2.

The volume data transmission system according to the embodiment of the present invention based on the above principle will be described in more detail below.

Figure 3:
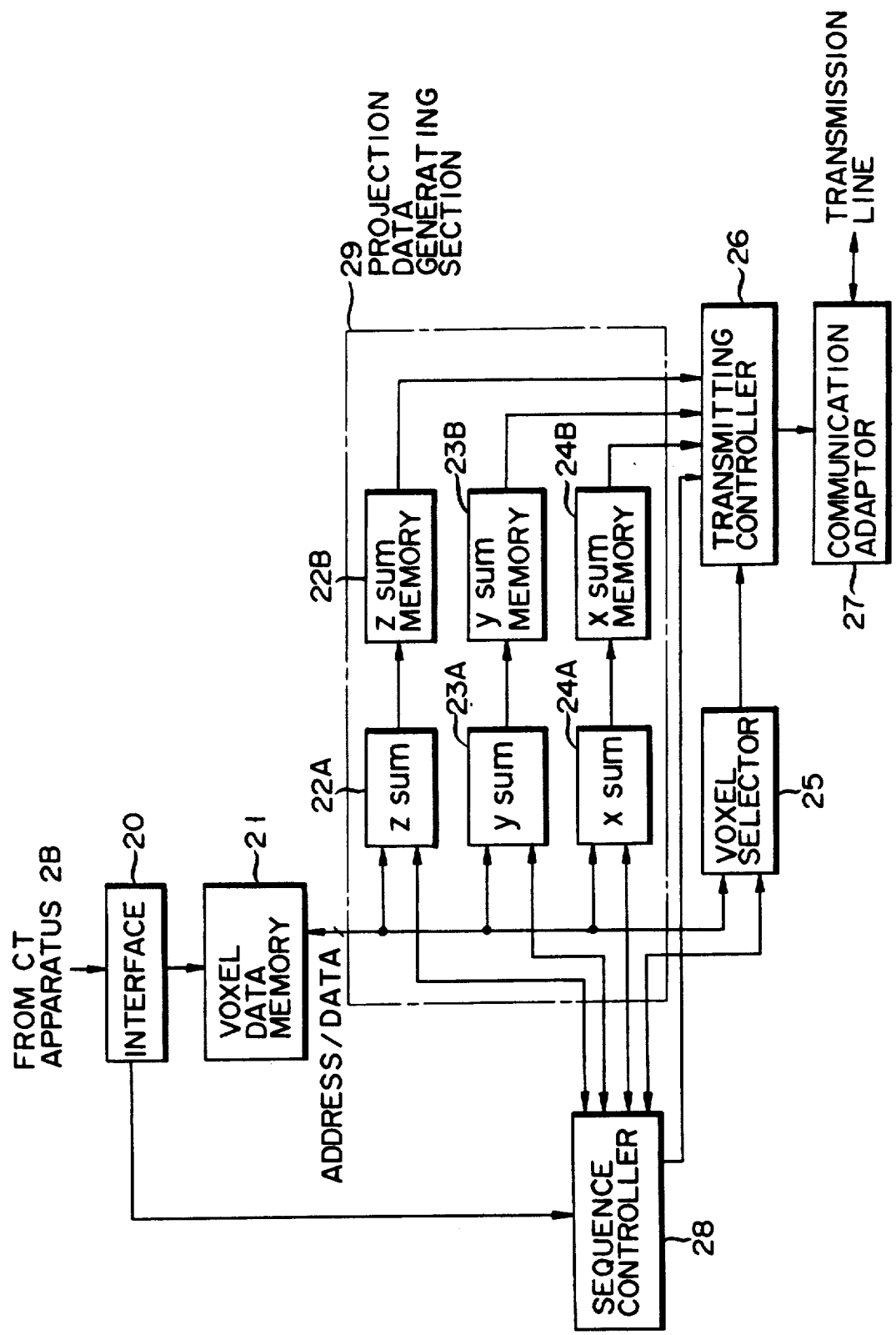
FIG. 3 is a block diagram showing an arrangement of a transmitter section of the system in FIG. 1.
Figure 4:
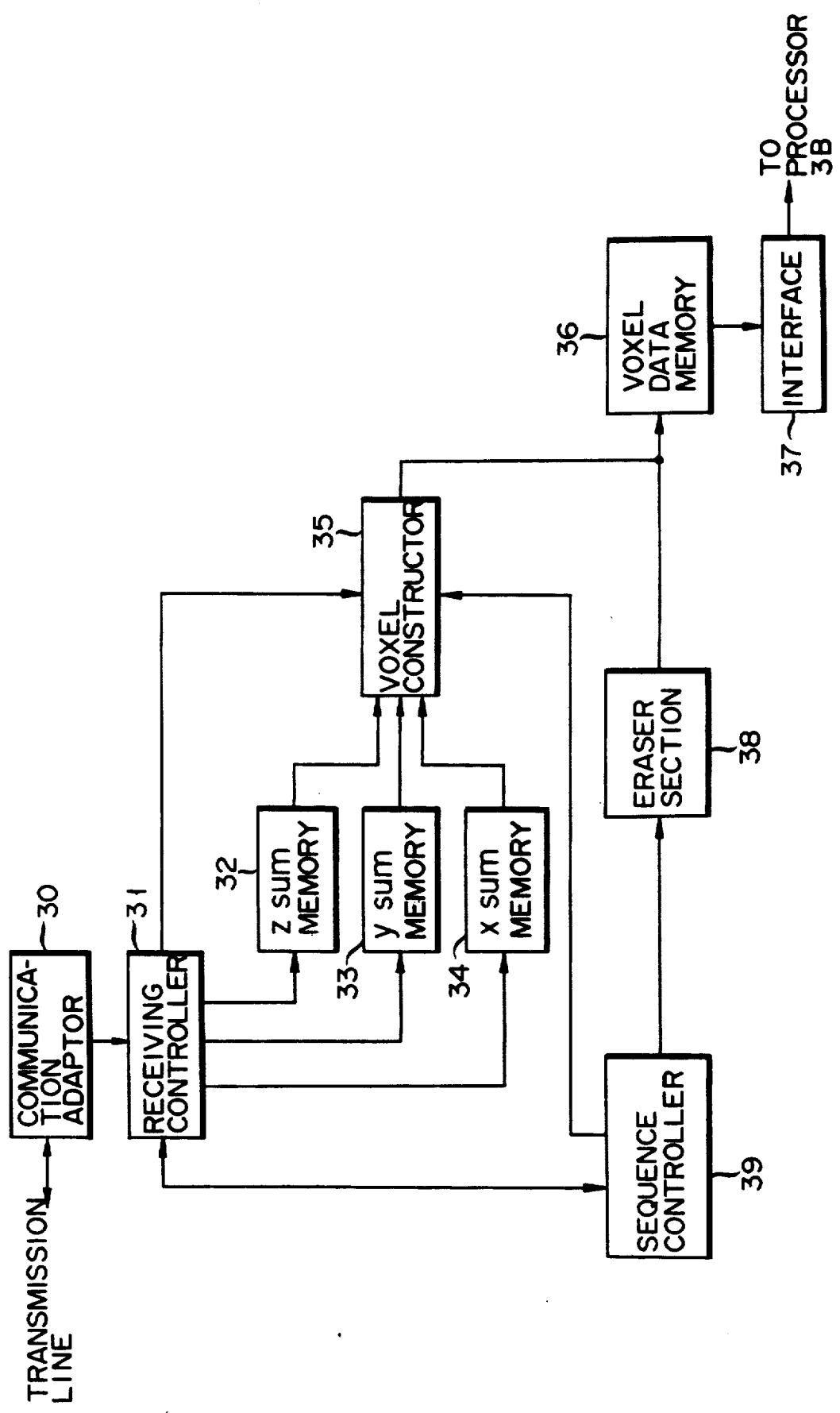
FIG. 4 is a block diagram showing an arrangement of a receiver section of the system in FIG. 1.

FIG. 3 shows transmitter section 2A of transmitting system 2 in the volume data transmission system in detail, and FIG. 4 shows receiver section 3A of receiving system 3 in the volume data transmission system in detail.

Transmitter section 2A shown in FIG. 3 comprises interface 20, voxel data memory 21, voxel selector 25, transmitting controller 26, communication adaptor 27, sequence controller 28, and projection data generating section 29. Section 29 comprises zsum, ysum, and xsum calculators 22A, 23A, and 24A and zsum, ysum, and xsum memories 22B, 23B, and 24B.

Binary voxel data obtained by CT apparatus 2B having a computer and capable of binarizing volume data based on CT image information is transmitted from the computer of CT apparatus 2B to voxel data memory 21 through interface 20.

After the binary voxel data is written in memory 21, zsum calculator 22A calculates binary projection data zsum in the z-axis direction of memory 21, and calculated binary projection data zsum is formed on zsum memory 22B.

Calculation by calculator 22A is performed in accordance with the following principle.

For example, in binary voxel, data having 256×256×256 voxels:

binary projection data zsum (x,y) is a logical sum of VOXEL (x,y,0), VOXEL (x,y,1), VOXEL (x,y,2), ... VOXEL (x,y,255);

binary projection data ysum (x,z) is a logical sum of VOXEL (x,0,z), VOXEL (x,1,z), VOXEL (x,2,z), ...VOXEL (x,255,z); and binary projection data xsum (y,z) is a logical sum of VOXEL (0,y,z), VOXEL (1,y,z), VOXEL (2,y,z), ...VOXEL (255,y,z).

Each of data zsum (x,y), ysum (x,z), and xsum (y,z) is constituted by a pixel corresponding to an array of voxels along a corresponding axis direction. A pixel corresponding to a voxel array in which at least one voxel is "1" is "1", and all the other pixels are "0"s. Therefore, data zsum (x,y), ysum (x,z), and xsum (y,z) are image data like shadow pictures in the respective axis directions of the voxel data. FIG. 2 is a schematic view showing binary projection data zsum, ysum, and xsum.

Binary projection data zsum, ysum, and xsum are transmitted by transmitting controller 26 onto a transmission line, connected to receiving system 3, through communication adaptor 27. Then, voxel selector 25 transmits only a voxel in which a shadow is projected on any of data xsum, ysum, and zsum in the x-, y-, and z-axis directions (i.e., a corresponding pixel goes to "1") onto the transmission line through adaptor 27.

This processing can be described in a program language manner as indicated below:

```
Transmit xsum, ysum, and zsum.
    for (z = 0 to 255)
        for (y = 0 to 255)
            for (x = 0 to 255)
                if  zsum (x,y) = 1 and
                    ysum (x,z) = 1 and
                    xsum (y,z) = 1
                then
                    Transmit VOXEL (x,y,z).
                else null
                end if
            done
        done
    done
```

Sequence controller 28 controls the above sections to sequentially calculate binary projection data zsum, ysum, and xsum after the data is transmitted to voxel data memory 21, to transmit calculated data zsum, ysum, and xsum, and then to selectively transmit voxel data selected on the basis of data zsum, ysum, and xsum.

Receiver section 3A shown in FIG. 4 comprises communication adaptor 30, receiving controller 31, zsum, ysum, and xsum memories 32, 33, and 34, voxel constructor 35, voxel data memory 36, interface 37, eraser section 38, and sequence controller 39.

Binary projection data zsum, ysum, and xsum transmitted from the transmission line for the first time are stored in zsum, ysum, and xsum memories 32, 33, and 34, respectively, through adaptor 30 and receiving controller 31. Orders of reception and storage are properly controlled by sequence controller 39.

Immediately after receiving controller 31 receives data zsum, ysum, and xsum, eraser section 38 clears the contents of voxel data memory 36.

After data zsum, ysum, and xsum are received and the contents of memory 36 are cleared, the voxel data is received in substantially the same manner as it is transmitted. That is, data input through adaptor 30 and controller 31 is stored in only VOXEL (x,y,z) which satisfies the condition of zsum (x,y)=1 and ysum (x,z) = 1 and xsum (y,z)=1.

This processing can be described in a program language manner as indicated below:

```
Receive xsum, ysum, and zsum.
    for (z = 0 to 255)
        for (y = 0 to 255)
            for (x = 0 to 255)
                if  zsum (x,y) = 1 and
                    ysum (x,z) = 1 and
                    xsum (y,z) = 1
                then
                    Receive (store)
                    VOXEL (x,y,z).
                else null
                end if
            done
        done
    done
```

Figure 5:
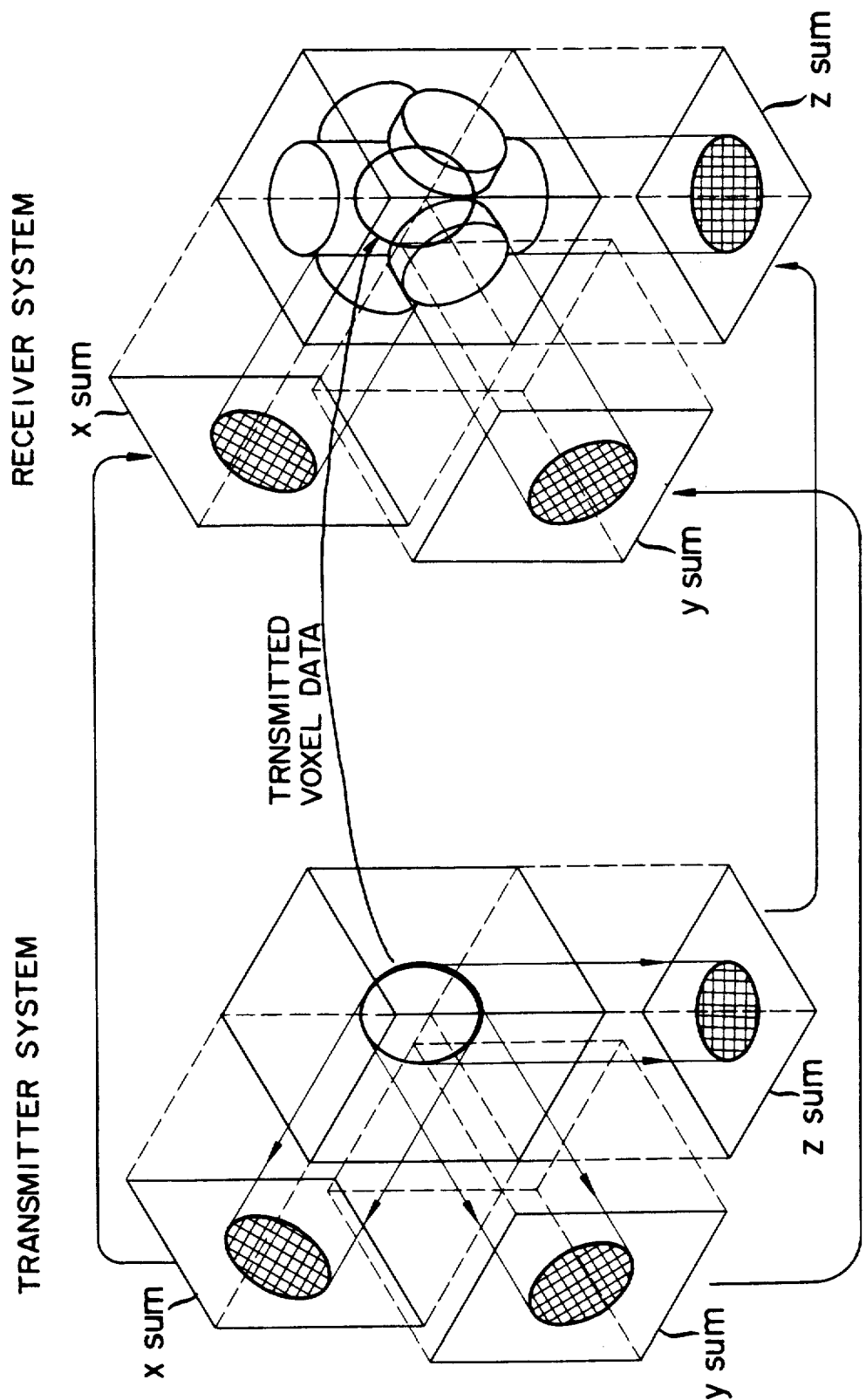
FIG. 5 is a schematic perspective view for explaining functions of the entire system in FIG. 1.

FIG. 5 schematically shows the entire transmitting-/receiving processing described above.

That is, in the transmitting system, binary voxel data is formed on the basis of the volume data obtained from CT apparatus 2B, and the binary volume data is projected on the x-, y-, and z-axis directions to form binary projection data xsum, ysum, and zsum, respectively. Upon transmission, data xsum, ysum, and zsum and only voxel data present in all of data xsum, ysum, and zsum are transmitted. In the receiving system, the voxel data transmitted on the basis of data xsum, ysum, and zsum is rearranged, thereby reconstructing the binary voxel data.

As described above, since an address of effective voxel data is obtained in accordance with the binary projection data in the x-, y-, and z-axis directions in the transmitting/receiving side, transmission of unnecessary voxel data is restricted, i.e., only necessary voxel data can be transmitted. Therefore, transmission of the voxel data equal to that of all the voxel data can be performed at high speed. In addition, in the system of the present invention, data to be transmitted does not have size or code data for normal data compression. Therefore, data can always be transmitted at high speed because output size$\leq$input size is always obtained. According to the system of the present invention, the amount of data to be actually transmitted is reduced as the amount of an unnecessary background portion surrounding an object and included in volume data is increased, thereby achieving high efficiency of transmission.

In the above embodiment, binary voxel data is transmitted. However, in order to directly transmit voxel data (not binarized) consisting of 3-dimensional gradation data (gray scale data such as a CT value), binary projection data may be generated in accordance with whether voxel data falling within a desired gradation range is included, as described above, thereby transmitting only voxel data in a region corresponding to a pixel having a data value of "1" in the binary projection data.

Furthermore, in the above embodiment, the binary projection data in the x-, y-, and z-axis directions is used for the sake of simplifying calculations. However, binary projection data in other directions or in a larger number of directions may be used.

What is claimed is:

1. A volume data transmission system for transmitting volume data consisting of voxel data through a communication line, comprising:
   projection data generating means for generating binary projection data from the volume data in accordance with whether predetermined significant data is included in any of the voxel data along a plurality of predetermined directions in a 3-dimensional space;
   data selecting means for sequentially selecting only voxel data having significant data corresponding to any of the binary projection data on the basis of the binary projection data; and
   data transmitting means for transmitting the binary projection data and the sequentially-selected voxel data.

2. A system according to claim 1, wherein the volume data consists of voxel data corresponding to a gradation value.

3. A system according to claim 1, wherein the volume data consists of binary voxel data.

4. A system according to claim 1, wherein said projection data generating means includes means for generating binary projection data in three orthogonal axis directions.

5. A system according to claim 1, wherein said projection data generating means includes means for generating binary projection data in three orthogonal axis directions corresponding to coordinate axes of the voxel data.

6. A system according to claim 1, wherein said data transmitting means includes means for sequentially transmitting the binary projection data and the selected voxel data through a single transmission line.

7. A volume data transmission system for receiving transmission data including: binary projection data obtained by projecting and binarizing volume data consisting of voxel data in accordance with whether predetermined significant data is included in any of voxel data along a plurality of predetermined directions in a 3-dimensional space; and voxel data sequentially selected from the voxel data on the basis of the binary projection data and having significant data corresponding to any of the binary projection data, comprising:

a voxel data memory for storing volume data consisting of voxel data;

initializing means for clearing contents of said voxel data memory prior to receiving data;

address generating means for generating an address of said voxel data memory corresponding to voxel data having significant data corresponding to any of the received binary projection data on the basis of the order in which the voxel data is received; and data storing means for storing the received voxel data in said voxel data memory in accordance with the address generated by said address generating means.

8. A system according to claim 7, wherein the volume data consists of voxel data corresponding to a gradation value.

9. A system according to claim 7, wherein the volume data consists of binary voxel data.

10. A system according to claim 7, wherein the binary projection data are data along three orthogonal axis directions.

11. A system according to claim 7, wherein the binary projection data are data along three orthogonal axis directions corresponding to coordinate axes of the voxel data.

* * * * *